(12) United States Patent
Anders et al.

(10) Patent No.: US 10,718,257 B1
(45) Date of Patent: Jul. 21, 2020

(54) DUAL-FUEL COMBUSTION METHOD AND SYSTEM

(71) Applicant: Caterpillar Inc., Deerfield, IL (US)

(72) Inventors: Jonathan W. Anders, Peoria, IL (US); Bobby John, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 9 days.

(21) Appl. No.: 16/248,561

(22) Filed: Jan. 15, 2019

(51) Int. Cl.
| | |
|---|---|
| *F02D 41/30* | (2006.01) |
| *F02B 7/08* | (2006.01) |
| *F02B 11/00* | (2006.01) |
| *F02D 19/10* | (2006.01) |
| *F02D 41/00* | (2006.01) |

(52) U.S. Cl.
CPC ............... *F02B 7/08* (2013.01); *F02B 11/00* (2013.01); *F02D 19/10* (2013.01); *F02D 41/0027* (2013.01); *F02D 41/3047* (2013.01)

(58) Field of Classification Search
CPC ........ F02B 7/08; F02B 11/00; F02D 41/0027; F02D 41/3047; F02D 19/10
USPC ............ 123/298, 304, 27 GE, 525, 575, 431
See application file for complete search history.

(56) References Cited

U.S. PATENT DOCUMENTS

| | | | | |
|---|---|---|---|---|
| 7,143,738 B2 * | 12/2006 | Ganz | ....................... | F02B 17/00 123/295 |
| 7,942,126 B2 * | 5/2011 | Zoller | ................. | F02B 23/0651 123/298 |
| 8,459,229 B2 | 6/2013 | Rothbauer et al. | | |
| 8,646,428 B2 * | 2/2014 | Eismark | .............. | F02B 23/0627 123/193.6 |
| 9,279,361 B2 | 3/2016 | Rothbauer et al. | | |
| 9,611,806 B2 | 4/2017 | Subatch, Jr. et al. | | |
| 9,638,131 B2 | 5/2017 | Koci et al. | | |
| 9,909,489 B1 * | 3/2018 | Koci | .................... | F02B 23/0627 |
| 10,024,221 B2 * | 7/2018 | Nomura | .............. | F02B 23/0651 |
| 10,030,574 B2 * | 7/2018 | Martinez | ............. | F02B 23/0624 |
| 10,060,386 B2 * | 8/2018 | Eismark | .............. | F02B 23/0651 |
| 2013/0092123 A1 * | 4/2013 | Straub | ................. | F02B 23/0651 123/298 |
| 2015/0053172 A1 * | 2/2015 | Long | .................... | F02B 23/0651 123/298 |
| 2018/0119637 A1 | 5/2018 | John et al. | | |

FOREIGN PATENT DOCUMENTS

CN            207420706 U     5/2018

\* cited by examiner

*Primary Examiner* — Hai H Huynh
(74) *Attorney, Agent, or Firm* — Bookoff McAndrews

(57) ABSTRACT

A method of operating a dual-fuel combustion system includes reciprocating a piston between a bottom dead center and a top dead center of a cylinder, the piston including a piston bowl, a circumferentially extending recess located radially outside of the piston bowl, and a plurality of diverters in the recess. The method includes opening an intake valve to introduce a first fuel, and injecting, by a set of fuel injector orifices substantially aligned with the diverters, a second fuel toward the diverters. The method also includes autoigniting the second fuel to ignite the first fuel.

20 Claims, 7 Drawing Sheets

DUAL-FUEL COMBUSTION METHOD AND SYSTEM

TECHNICAL FIELD

The present disclosure relates generally to internal combustion engines, and more particularly, to dual-fuel combustion methods and systems for internal combustion engines.

BACKGROUND

Internal combustion engines are useful in various applications, including propulsion, electricity generation, and operation of heavy machinery. Internal combustion engines include one or more pistons that each reciprocate within a piston cylinder. The motion of the piston is driven by at least one combustion event in a combustion cycle. Internal combustion engines may be designed to run on gasoline fuel, in which a spark plug initiates combustion, on diesel fuel, that is compression ignited, or on other fuels, such as gaseous fuels. Engines can also run by combusting two different fuel types in a single combustion cycle.

The use of two fuels in a single combustion cycle can provide benefits by substituting a portion of fuel that may produce greater emissions, or that may have higher cost, with another fuel that may produce fewer emissions and/or have a reduced cost. However, the substitution of a large amount of fuel can lead to incomplete combustion or hot spots in the combustion chamber, which can result in decreased engine performance, greater emissions, and increased wear, among other potential issues. Such dual-fuel systems may be assisted by piston designs that address the unique aspects of combusting two fuels in a single combustion cycle.

An exemplary piston design is disclosed in U.S. Pat. No. 8,459,229 ("the '229 patent") to Rothbauer et al. The '229 patent discloses a piston having a piston bowl including "surface features." The surface features are located at the outer edge of the piston bowl and form a target for fuel spray from an injector. The surface features are intended to reduce soot and improve fuel-air mixing. While the piston surface features described in the '229 patent may be useful in some circumstances, they may be less helpful in other situations. For example, the position and shape of the surface features of the '229 patent may not be configured for dual-fuel combustion.

The disclosed method and combustion system for an internal combustion engine may solve one or more of the problems set forth above and/or other problems in the art. The scope of the current disclosure, however, is defined by the attached claims, and not by the ability to solve any specific problem.

SUMMARY

In one aspect, a method of operating a dual-fuel combustion system may include reciprocating a piston between a bottom dead center and a top dead center of a cylinder, the piston including a piston bowl, a circumferentially extending recess located radially outside of the piston bowl, and a plurality of diverters in the recess. The method may include opening an intake valve to introduce a first fuel, and injecting, by a set of fuel injector orifices substantially aligned with the diverters, a second fuel toward the diverters. The method may also include autoigniting the second fuel to ignite the first fuel.

In another aspect, a method of operating a dual-fuel internal combustion engine having a plurality of pistons reciprocating in corresponding piston cylinders and forming a plurality of combustion chambers may include, in a dual-fuel combustion mode: opening an intake valve to introduce a first fuel, and injecting a second fuel into the combustion chamber toward a plurality of diverters in a piston of the combustion chamber, wherein autoignition of the second fuel initiates ignition of the first fuel. The method may also comprise: in a second single-fuel combustion mode: injecting the second fuel into the combustion chamber toward locations circumferentially offset from the diverters, and combusting the second fuel to drive the piston of the combustion chamber.

In yet another aspect, an internal combustion system may include a piston bowl, a circumferentially extending recess located radially outside of the piston, and a plurality of diverters. The system may also include a first set of fuel injector orifices generally circumferentially aligned with the plurality of diverters and configured to inject fuel to impinge on the diverters, and a second set of fuel injector orifices generally circumferentially offset from the plurality of diverters.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value. As used herein, a "gaseous fuel" may include gaseous fuel such as, natural gas, methane, butane, propane, bio-gas, landfill gas, hydrogen, and blends thereof, for example. Natural gas is an exemplary gaseous fuel having various levels of purity. As used herein "natural gas" refers to both pure and relatively impure forms having various amounts of methane and other constituents. The gaseous fuel may be provided to an intake component of the internal combustion engine in a compressed form. The gaseous fuel may be stored in a liquid form in a storage tank, and converted to gas (e.g. by heating) prior to introduction to the intake component. As used herein, a "liquid fuel" may include gasoline, diesel, methanol, ethanol, or any other liquid fuel.

Figure 1:
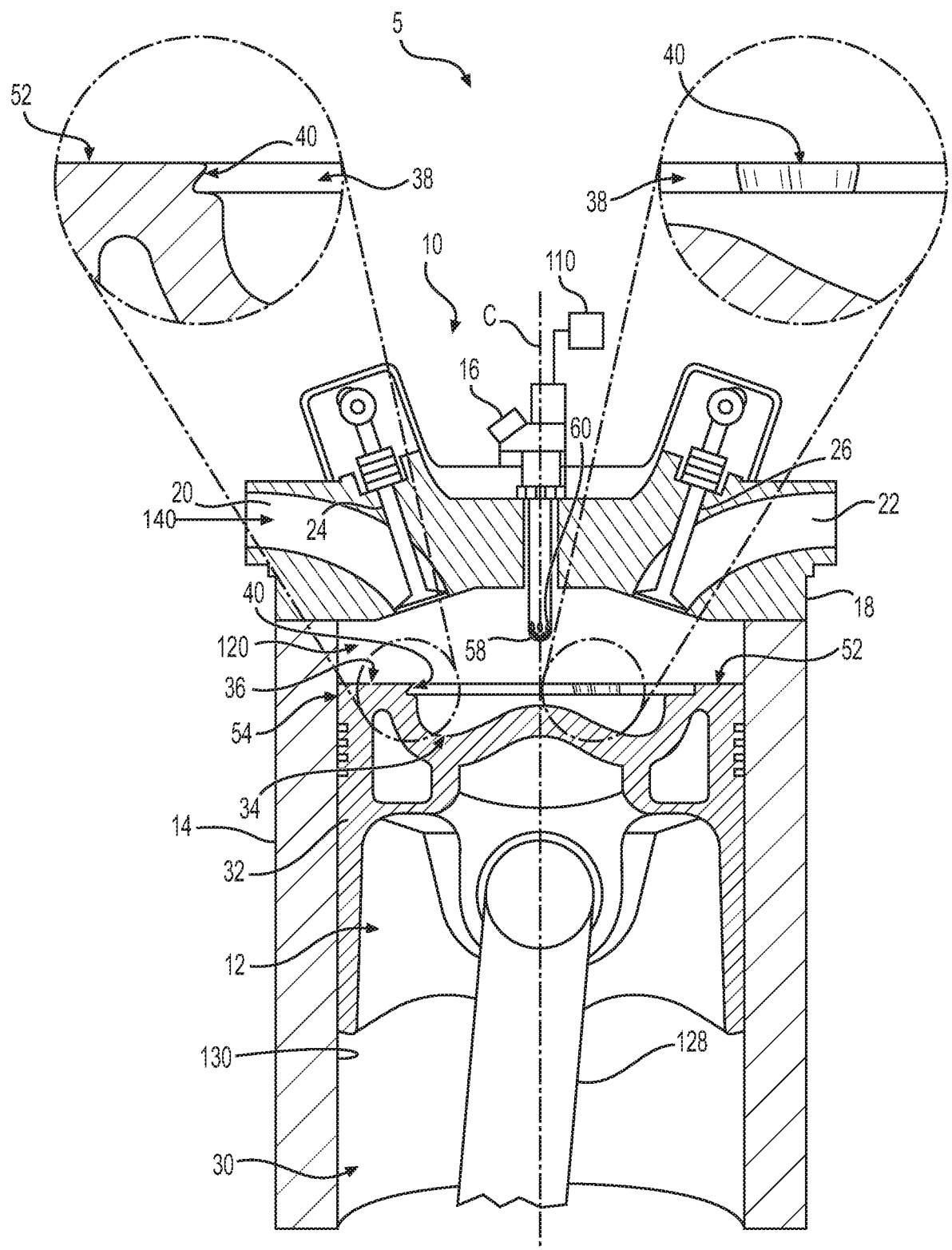
FIG. 1 is a sectional view of a portion of an internal combustion engine including a piston and having a plurality of diverters according to aspects of the disclosure.

FIG. 1 illustrates a sectional view of a portion of an internal combustion engine 5 including a combustion system 10 according to the present disclosure. Combustion system 10 may, for example, be a dual-fuel combustion system capable of operating in both a dual-fuel combustion mode and a single-fuel combustion mode. When combustion system 10 operates in dual-fuel mode, an exemplary first fuel, such as a gaseous fuel, an exemplary second fuel, such as a liquid fuel, can be employed in a single combustion cycle. In one aspect, natural gas, or similar gaseous fuel, may be employed as the first fuel, and diesel fuel may be employed as the second fuel.

Internal combustion engine 5 may include a plurality of internal combustion systems 10, each of which may include a piston 12, a piston cylinder 14 in which piston 12 reciprocates, and a fuel injector 16. Combustion system 10 may also include a cylinder head 18 supporting injector 16, and in which an intake conduit 20 and an exhaust conduit 22 are formed. An intake valve 24 may be supported by cylinder head 18, and may control the opening and closing of intake conduit 20. An exhaust valve 26 may be supported by cylinder head 18, and may control the opening and closing of exhaust conduit 22. A combustion chamber 120 is defined within each piston cylinder 14 of internal combustion engine 5, and between piston 12 and cylinder head 18, to provide the space where combustion occurs when piston 12 is at or near a top-dead-enter (TDC) position.

Cylinder 14 includes a cylinder bore 30 defined by cylinder wall 130. As can be seen in FIG. 1, piston 12 is disposed within cylinder bore 30. Piston 12 includes a piston head 32 pivotably coupled to a connecting rod 128. Connecting rod 128 of piston 12 extends from piston head 32 to a crankshaft (not shown) located below cylinder bore 30 to translate reciprocating motion of piston 12 into rotational motion of the crankshaft. The top surface 36 of piston head 32 may include a piston bowl 34. Piston bowl 34 faces generally upward toward cylinder head 18, and may be of the Mexican Hat bowl design as shown. A central axis C is defined by the center of piston head 32 and passes through a center of piston bowl 34.

Figure 3:
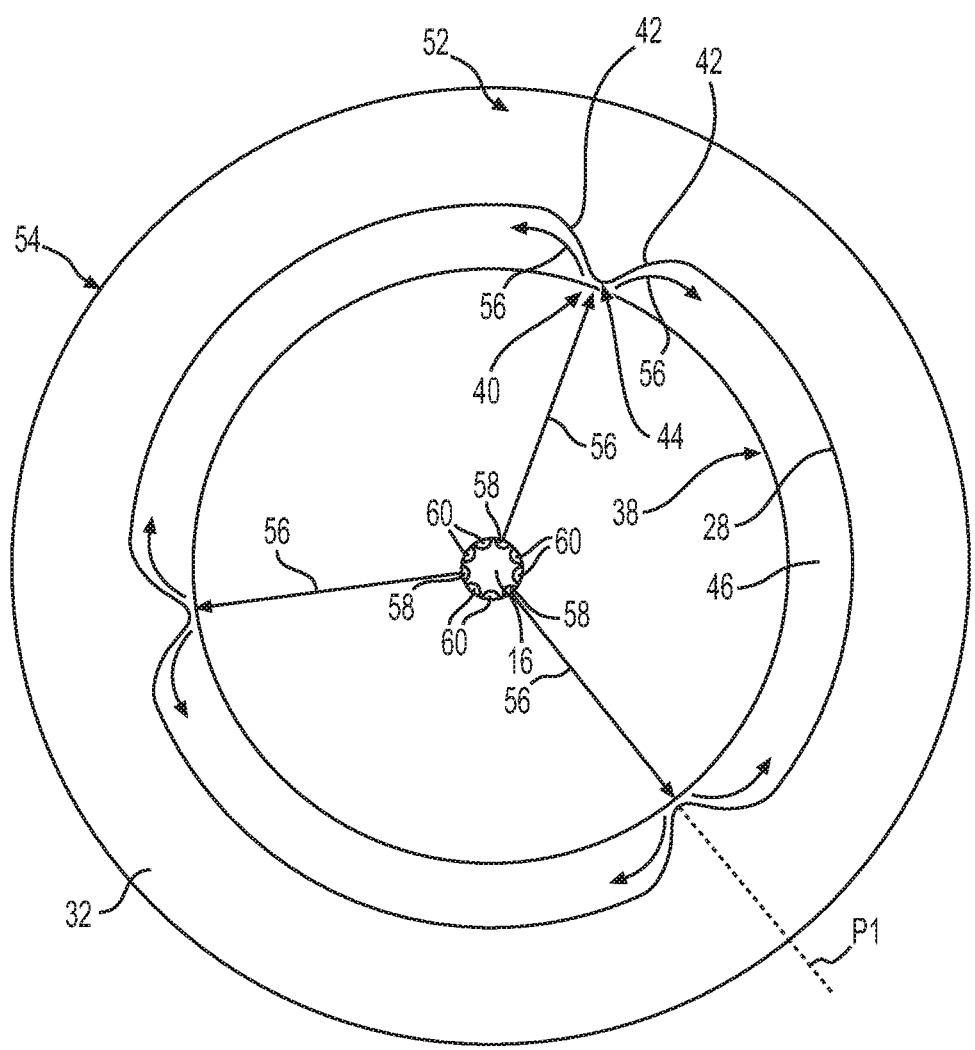
FIG. 3 is a top view illustrating the pilot injection of fuel on the diverters.

With continued reference to FIG. 1, a recess 38 is located radially outward of the piston bowl 34 in piston head 32. Recess 38 may extend circumferentially so as to surround at least a part of piston bowl 34. In one aspect, recess 38 extends circumferentially about the entire perimeter, or 360°, around piston bowl 34. Recess 38 includes a plurality of diverters 40, two of which can be seen in the sectional view of FIG. 1 (and in the enlarged portions of FIG. 1). As best shown in FIG. 3, recess 38 may include a circumferentially extending flat side wall 28 and a circumferentially extending flat bottom wall 46. The bottom wall 46 may extend approximately perpendicular to the side wall 28 and central axis C.

Referring back to FIG. 1, a radially outer portion of top surface 36 of piston head 32 forms a crown portion 52 that extends radially outward of recess 38 and diverters 40. The crown portion 52 may be formed by a circumferentially extending flat surface extending to the radially outer-most surface or side 54 of piston head 32. Thus, crown portion 52 defines a portion of piston head 32 located radially outward of the diverters 40 and radially outward of the recess 38.

Fuel injector 16 may include a first set of fuel injector orifices 58 (e.g., pilot fuel orifices) and a second set of fuel injector orifices 60 (e.g., main fuel orifices) that are provided above piston 12. The first set of fuel injector orifices 58 and the second set of fuel injector orifices 60 may both be configured to inject liquid fuel. In an exemplary configuration, the first set of fuel injector orifices 58 may be provided closer to piston 12 (e.g., closer to a distal end of fuel injector 16) than the second set of fuel injector orifices 60. While the first set of fuel injector orifices 58 and the second set of fuel injector orifices 60 may be provided on the same fuel injector (e.g. fuel injector 16), the first and second sets of fuel injector orifices 58 and 60 may be provided on separate fuel injectors of combustion chamber 120.

Combustion system 10 may include a controller 110 such as an electronic control unit (ECU) configured to monitor and control various operations of combustion system 10. Controller 110 may include a processor configured to receive and process various signals, including a signal indicative of a position of piston 12, e.g., a position with respect to the TDC position of piston 12. Controller 110 may output signals including an injector control signal to control the actuation of fuel injector 16. Controller 110 may also output signals to control actuation of an additional fuel injector included in combustion system 10. In one aspect, controller 110 may be included in an engine control module (ECM) configured to monitor and control operations of the entire internal combustion engine. However, controller 110 may alternatively be a fuel system controller for controlling aspect of the fuel system.

As best shown in FIG. 3, diverter 40 may extend or protrude radially inward from the side wall 28 of recess 38 toward a center of piston head 32, and may include a pair of converging side walls 42. The converging side walls 42 may be straight or slightly curved (as shown) in a width direction, and may converge to a leading edge 44 centrally located on diverter 40. For example, converging side walls 42 may flare outward from the leading edge 44 and form concave profiles when viewed from central axis C. Converging side walls 42 and front leading edge 44 may extend in a height direction from bottom wall 46 of recess 38 to a top surface portion of crown portion 52. Further, diverter 40 may be curved or angled in the height direction. For example, as best shown in FIG. 1, a top portion of the diverter 40 may extend radially farther toward central axis C than a bottom portion of the diverter 40, thereby forming a generally acute angle the bottom wall of recess 38. Accordingly, leading edge 44 may terminate at a vertex at a top portion of the diverter 40. However, it is understood that diverter 40 can take alternative shapes, for example, the converging side walls 42 and leading edge 44 may be formed with surfaces extending perpendicular to bottom wall 46, and the height of the diverter 40 may extend less than the height of the sidewall 28 of recess 38.

Figure 5:
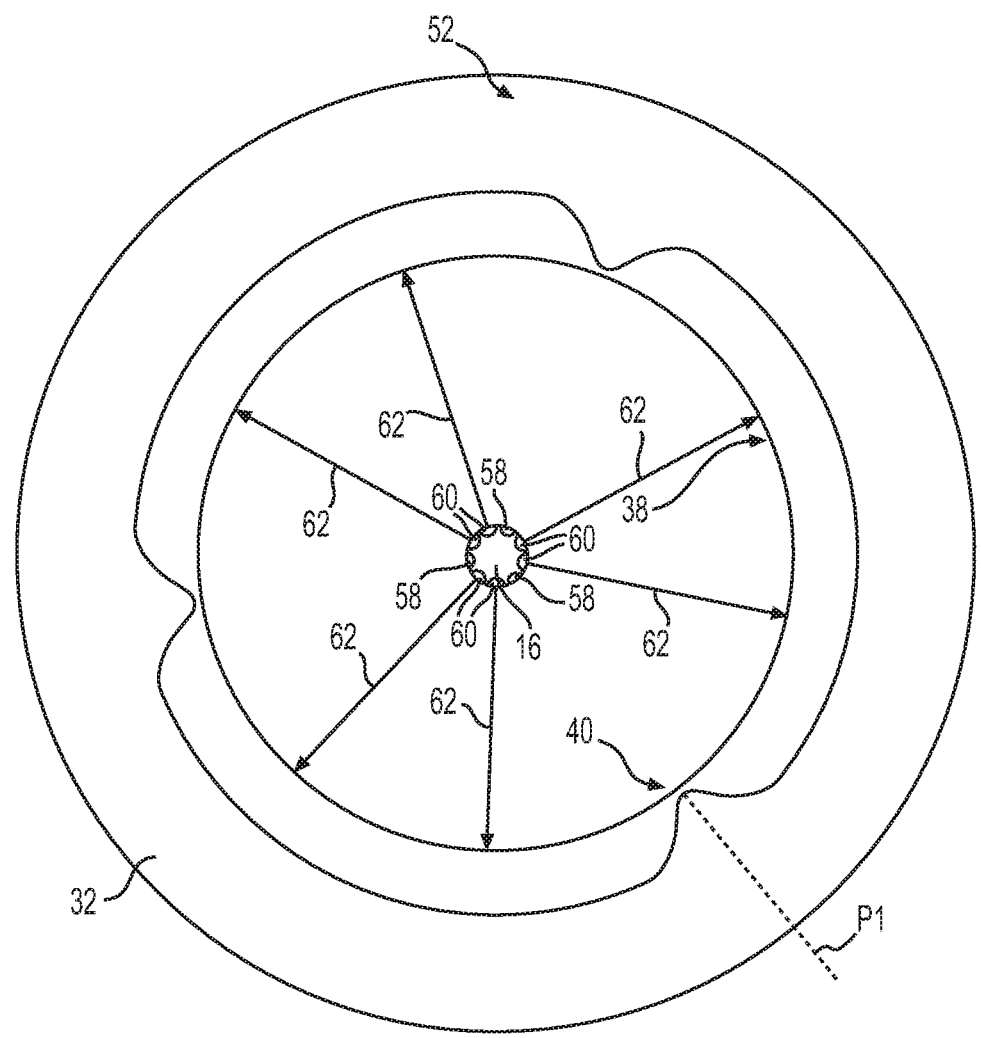
FIG. 5 is a top view illustrating the main injection of fuel on the piston bowl.

FIGS. 3 and 5 illustrate the relationship the first set of fuel injector orifices 58 and the second set of fuel injector orifices 60 may have with diverters 40 and piston bowl 34. The side walls 42 of diverters 40 may be curved in a symmetric manner with respect to a plane P1 that passes through leading edge 44 and central axis C. Thus, leading edge 44 is disposed at an approximate center of diverter 40 in a circumferential direction. However, in an alternate configuration, diverter 40 may have an asymmetric configuration. For example, one of the side walls 42 may be formed as a substantially straight wall extending orthogonal with respect to side wall 28.

In an exemplary configuration, each diverter 40 may have an angular or circumferential width of between 30 and 60 degrees, and be spaced approximately 120 degrees from each other. Thus, the diverters 40 may be approximately equally spaced apart. While three diverters 40 are depicted in FIGS. 3 and 5, two diverters 40, four diverters 40, or more than four diverters 40 can be present. When two diverters 40 are present in recess 38, for example, each diverter 40 may be spaced approximately 180 degrees apart. Similarly, four diverters 40 provided in recess 38 may be spaced apart by approximately 90 degrees. As the number of diverters 40 in the recess 38 changes, the circumferential width and the spacing of the diverters 40 may be modified accordingly.

Fuel injector 16 may be centrally disposed with respect to piston head 32. As noted above, fuel injector 16 may include a first set of fuel injector orifices 58 that each inject fuel into combustion chamber 120 in response to a control signal from controller 110. The number of fuel injector orifices in first set 58 may be the same as the number of diverters 40 provided in recess 38 of piston 12. The first set of fuel injector orifices 58 may be equally spaced about a circumference of fuel injector 16. Thus, as illustrated in FIG. 3, when three fuel injector orifices are provided in first set 58 in fuel injector 16, three diverters 40 are provided within recess 38 so that each diverter 40 is circumferentially aligned, or generally circumferentially aligned, with a respective fuel injector orifice of the first set 58.

In particular, the leading edge 44 of diverters 40 may be circumferentially aligned with a respective fuel injector orifice of first set 58. As used herein, the phrase "circumferentially aligned with a fuel injector orifice" is based on a circumferential position of a central longitudinal axis of the fuel injector orifice extended in the direction toward the piston 12. This central longitudinal axis of the fuel injector orifices of first set of 58 is depicted in the FIG. 3 as a line representing a pilot fuel jet 56. As can be seen in FIG. 3, in such an arrangement, the leading edges 44 of diverters 40 are impinged by a fuel jet 56 exiting the fuel injector orifices included in first set 58 of fuel injector 16. However, when diverters 40 are provided with an asymmetric shape, fuel injector orifices in the first set 58 may be circumferentially aligned, or generally circumferentially aligned, with one of the sidewalls of the diverter 40 rather than a plane of symmetry or leading edge 44.

As best shown in FIG. 5, each fuel injector orifice of the second set of fuel injector orifices 60 may be circumferentially aligned with positions that are offset from the diverters 40. Thus, a circumferential position of a central longitudinal axis of each fuel injector orifice in the second set 60 extends in the direction toward a portion of piston 12 that is offset from diverters 40. This central longitudinal axis of each fuel injector orifice in second set 60 is depicted in FIG. 5 as a line representing a main fuel jet 62. As can be seen, fuel jets 62 are spaced from each diverter 40, particularly from a center of each diverter 40. Thus, fuel injector orifices in second set 60 may provided with a configuration that ensures that fuel jets 62 do not substantially impinge upon diverters 40.

As also illustrated in FIG. 5, the first and second sets of fuel injector orifices 58, 60, may be provided in a configuration such that the holes formed by each orifice do not overlap each other along a circumference of injector 16. However, in other configurations, some overlap may be present by providing the second set of fuel injector orifices 60 above or below the first set of fuel injector orifices 58 on fuel injector 16, or on an additional fuel injector. Such a configuration may allow for greater flexibility for aiming main fuel jets 62 to different positions of piston bowl 34.

In some configurations, it is desirable that the second set of fuel injector orifices 60 is configured to inject a greater quantity of fuel than the first set of fuel injector orifices 58. For this reason, the orifices in the second set 60 may have a greater size and/or be provided in a greater number as compared to the orifices in the first set 58. As shown in the exemplary configuration depicted in FIGS. 3 and 5, the number of orifices of the second set 60 may be six, while the number of orifices of the first set 58 may be three. However, five orifices, or fewer, could be provided in second set 60, whether the second set 60 is provided in fuel injector 16 or in a separate fuel injector. Similarly, seven or more fuel injector orifices 60 may be provided in the second set 60 in fuel injector 16 or in a separate fuel injector.

INDUSTRIAL APPLICABILITY

The disclosed aspects of internal combustion engine 5 and combustion system 10 can be employed in a variety of devices. For example, internal combustion engine 5 and combustion system 10 may be used for any machine that utilizes power generated by the combustion of one or more fuels.

Figure 6:
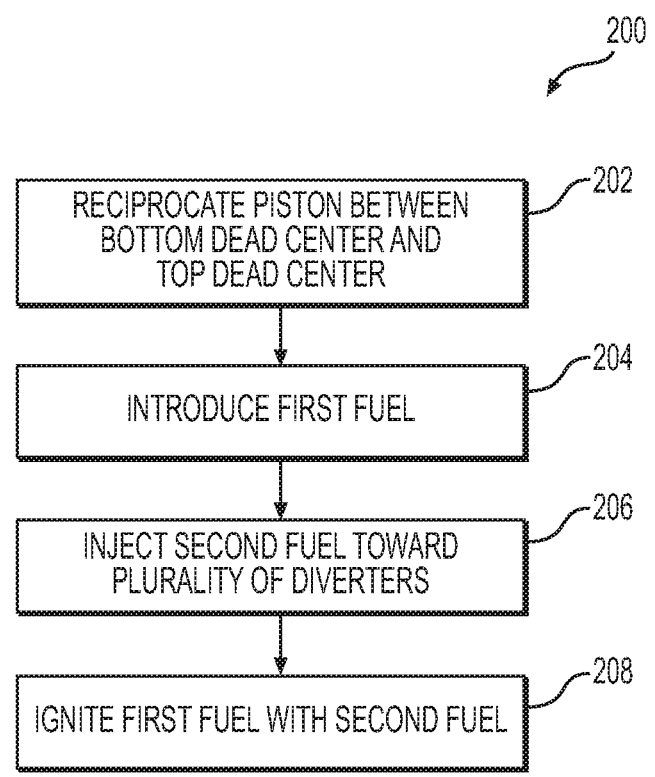
FIG. 6 is a flowchart illustrating an exemplary method according to aspects of the disclosure.

FIG. 6 is a flowchart illustrating an exemplary method 200 of operating dual-fuel combustion system 10 in internal combustion engine 5. Method 200 may correspond to a dual-fuel mode performed by combustion system 10 in either a continuous or intermittent manner.

In a step 202 piston 12 may reciprocate between a BDC position and a TDC position. The reciprocation of piston 12 during step 202 may occur during an intake stroke, a compression stroke, a combustion stroke, and an exhaust stroke. In one aspect, step 202 may be performed continuously when combustion system 10 is in operation.

In step 204, intake valve 24 may open to allow air to enter from intake conduit 20 into combustion chamber 120. This intake air may be charged or mixed with the gaseous first fuel. The mixing of the first fuel and air may be performed upstream of combustion system 10 via an intake port injector, by fumigation, or by another mechanism. In the example illustrated in FIG. 1, an intake system including intake conduit 20 and intake valve 24 may introduce a mixture of gaseous fuel and air into combustion chamber 120 by port injection. A passage of such air and gaseous fuel is represented by arrow 140 in FIG. 1. Step 204 may be performed at least partially during an intake stroke in which piston 12 moves from TDC toward BDC. To allow introduction of a sufficient quantity of air and fuel, the intake valve 24 may be open from approximately the beginning of the intake stroke (TDC) until approximately the end of the intake stroke (BDC). However, the precise timing during which intake valve 24 is open during step 204 may be somewhat varied so as not to precisely align with the beginning and end of the intake stroke. Step 204 may conclude when intake valve 24 returns to a closed position. In an alternate configuration, step 204 may be performed by introducing gaseous fuel by fuel injector 16, or by a separate fuel injector for gaseous fuel provided within combustion chamber 120.

Figure 2:
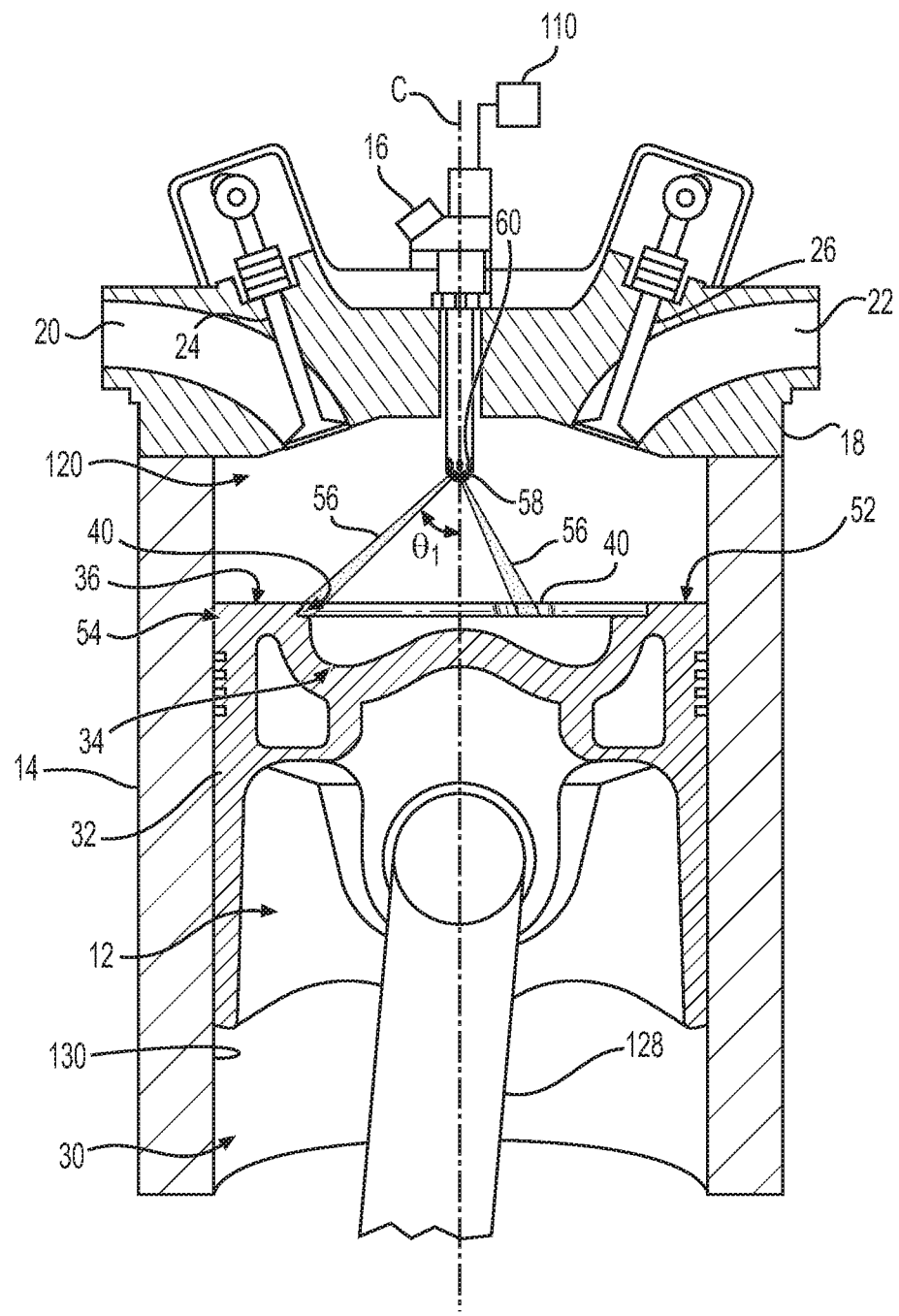
FIG. 2 is a sectional view of the portion of the internal combustion engine in FIG. 1 illustrating a pilot injection of fuel on a plurality of diverters.

In step 206, controller 110 may control injector 16 to inject pilot fuel jets 56 of second fuel via the first set of fuel injector orifices 58. As noted above, the second fuel may be diesel fuel. This injection may be performed during a portion of the compression stroke between BDC and TDC. Injection may be initiated in accordance with a control signal output by controller 110 based on a calculated position of piston 12. Controller 110 may begin this injection a first timing before piston 12 reaches TDC in the compression stroke. This first timing may correspond, for example, to a position of piston 12 within a range of about 60 degrees before TDC to about 40 degrees before TDC. In another aspect, the first timing may correspond to a position of piston 12 within a range of about 60 degrees before TDC to about 50 degrees before TDC. FIG. 2 illustrates the location of fuel jets 56 as the fuel jets impinge on diverters 40 immediately following the pilot injection. During the injection of step 206, a pilot spray angle $\theta_1$ may be defined by the angle between each pilot fuel jet 56 and central axis C. Pilot spray angle $\theta_1$ may be within a range of about 60 degrees to about 70 degrees, for example.

In step 206, each pilot fuel jet 56 may be injected into combustion chamber 120 toward each diverter 40, as best shown in FIG. 3. Thus, each fuel jet 56 may impinge upon leading edge 44 and side walls 42 of diverter 40, providing a more uniform distribution of pilot fuel in the region of recess 38. In particular, the curvature of side walls 42 of diverter 40 redirect the fuel jets 56 from a radial direction to a circumferential direction. The curvature of side walls 42 may also reduce momentum loss and allow each fuel jet 56 to gradually transition a radial component to a circumferential component about recess 38. At the center of diverters 40 leading edge 44 receives a respective fuel jet 56 and redirects the fuel jet 56 by separating (or splitting) and redirecting (or diverting) the fuel jet in two opposite circumferential directions. An upper overhang of the diverters 40 (see FIG. 1) may be provided to help prevent fuel jets 56 from escaping recess 38 and help retain fuel jets 56 within recess 38. Thus, fuel jets 56 may be directed to be generally retained in the area of recess 38, and in the periphery of combustion chamber 120 in step 206.

Following the injection of second fuel in step 206, piston 12 may continue toward TDC in the compression stroke, to a position near TDC (upward in FIG. 2). As the volume of space within combustion chamber 120 is reduced, the air within combustion chamber 120 is heated by compression. As such, at step 208, the combustion chamber 120 may reach a temperature and pressure sufficient to autoignite the second fuel introduced as pilot fuel jets 56. In one aspect, the autoignition may take place when the second fuel is distributed substantially around recess 38 after having been redirected by diverters 40. Thus, ignition in step 208 may generate a flame that is generally circumferentially distributed and localized in the area of recess 38. The flame may propagate in an inward direction toward central axis C, and initiate combustion of gaseous fuel that is located throughout the combustion chamber 120. The combustion of the first fuel may provide a primary power source for driving piston 12. Thus, in the dual-fuel mode (e.g., steps 204, 206, and 208) the piston 12 may be substantially driven by the first fuel. As used herein, piston 12 is "substantially driven" by the fuel that, provides a majority of the energy released in the combustion chamber 120 in a combustion cycle. Additionally, the first fuel may provide 90% or more of the energy released in combustion chamber 120 in a combustion cycle. Furthermore, the first fuel may provide 95% or more of the energy released in combustion chamber 120 in a combustion cycle.

Figure 7:
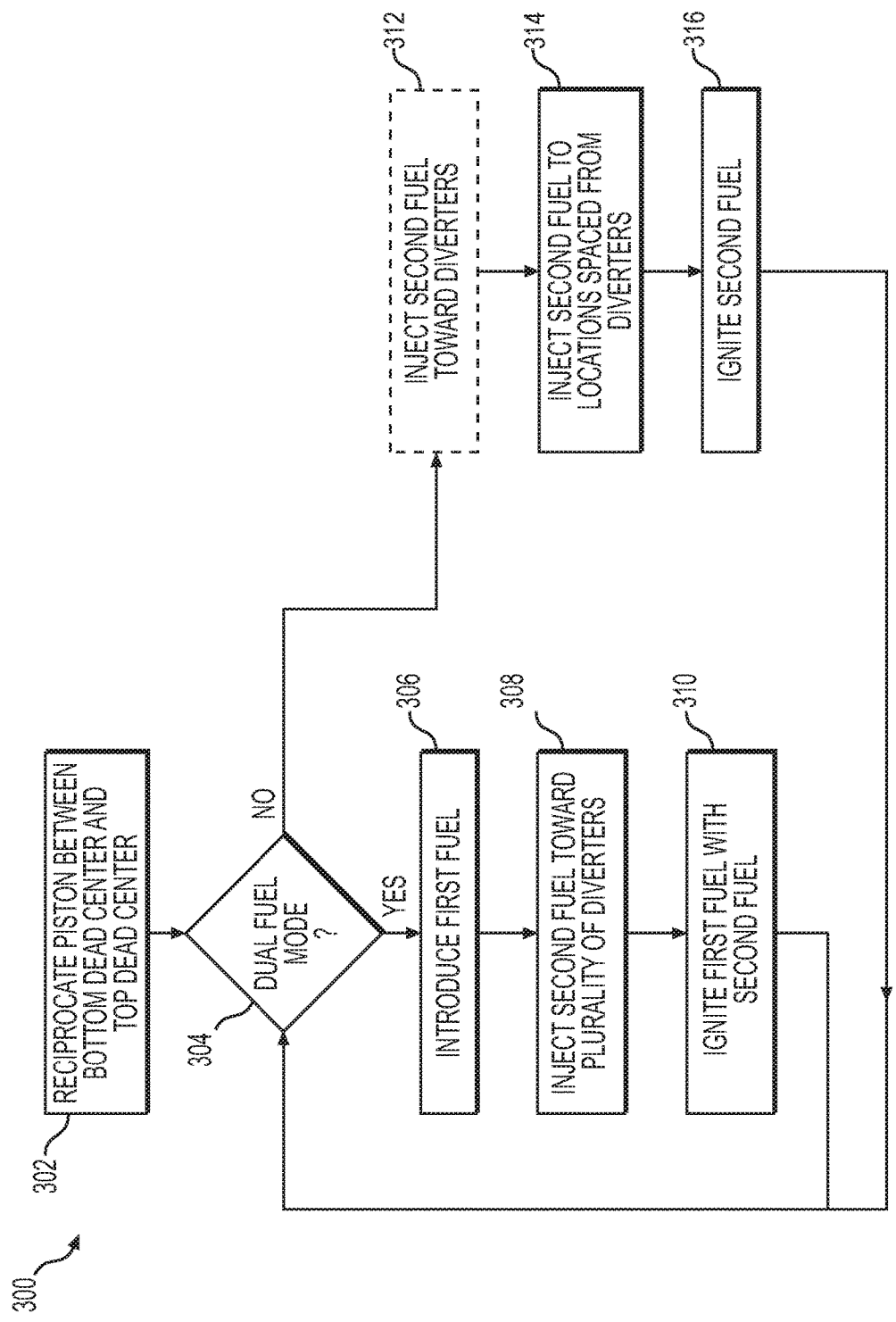
FIG. 7 is a flowchart illustrating an exemplary method according to aspects of the disclosure.

FIG. 7 is a flowchart illustrating an exemplary method 300 of operating a dual-fuel combustion system 10. In one aspect, method 300 may include both a dual-fuel combustion mode (e.g., steps 306, 308, and 310) and a single-fuel combustion mode (e.g., steps 312, 314, and 316). At a first step 302, piston 12 may repeatedly reciprocate between a BDC position and a TDC position. Step 302 may be performed continuously throughout method 300 (see step 202 above).

At step 304, a determination is made, for example by controller 110, whether combustion system 10 will operate in accordance with the dual-fuel combustion mode or the single-fuel combustion mode. This determination may be made by an operator selection, and/or determined by controller 110. For example, controller 110 may determine that an insufficient amount of gaseous fuel is available for the dual-fuel combustion mode, and may determine to perform a single-fuel combustion mode without an operator selection. If the determination corresponds to the dual-fuel combustion mode (represented by "yes" in FIG. 7), the process proceeds to steps 306, 308, and 310. The operation of combustion system 10 during steps 306, 308, and 310 may be performed in the same manner as in steps 204, 206, and 208, discussed above. Thus, during steps 306, 308, and 310, gaseous fuel and liquid fuel may be employed as the respective first and second fuels. Following steps 306, 308, and 310, step 304 may again be performed.

When the determination in step 304 is to operate combustion system 10 in a single-fuel combustion mode (represented by "no" in FIG. 7), the process may proceed to steps 312, 314, and 316. In a step 312, controller 110 may cause injector 16 or another fuel injector to inject second fuel from the first set of fuel injector orifices 58. This injection may be performed with a corresponding timing as discussed with respect to steps 206 and 308. Thus, step 312 may direct second fuel toward diverters 40 such that the second fuel impinges upon diverters 40 as shown in FIG. 3. Step 312 may be performed after TDC instead of, or in addition to, the timing discussed with respect to steps 206 and 308, such that fuel from the first set of fuel injector orifices 58 impinges on the diverters 40. Diesel fuel may be the single fuel injected during step 312. As represented by the illustration of step 312 in phantom in FIG. 7, step 312 may be an optional step that is omitted when necessary. In one aspect, controller 110 may determine when to omit (skip) step 312 and proceed to step 314. Controller 110 may determine to perform step 312 based on one or more operating conditions of the internal combustion engine 5 such as temperature, running time, emission considerations, etc.

Figure 4:
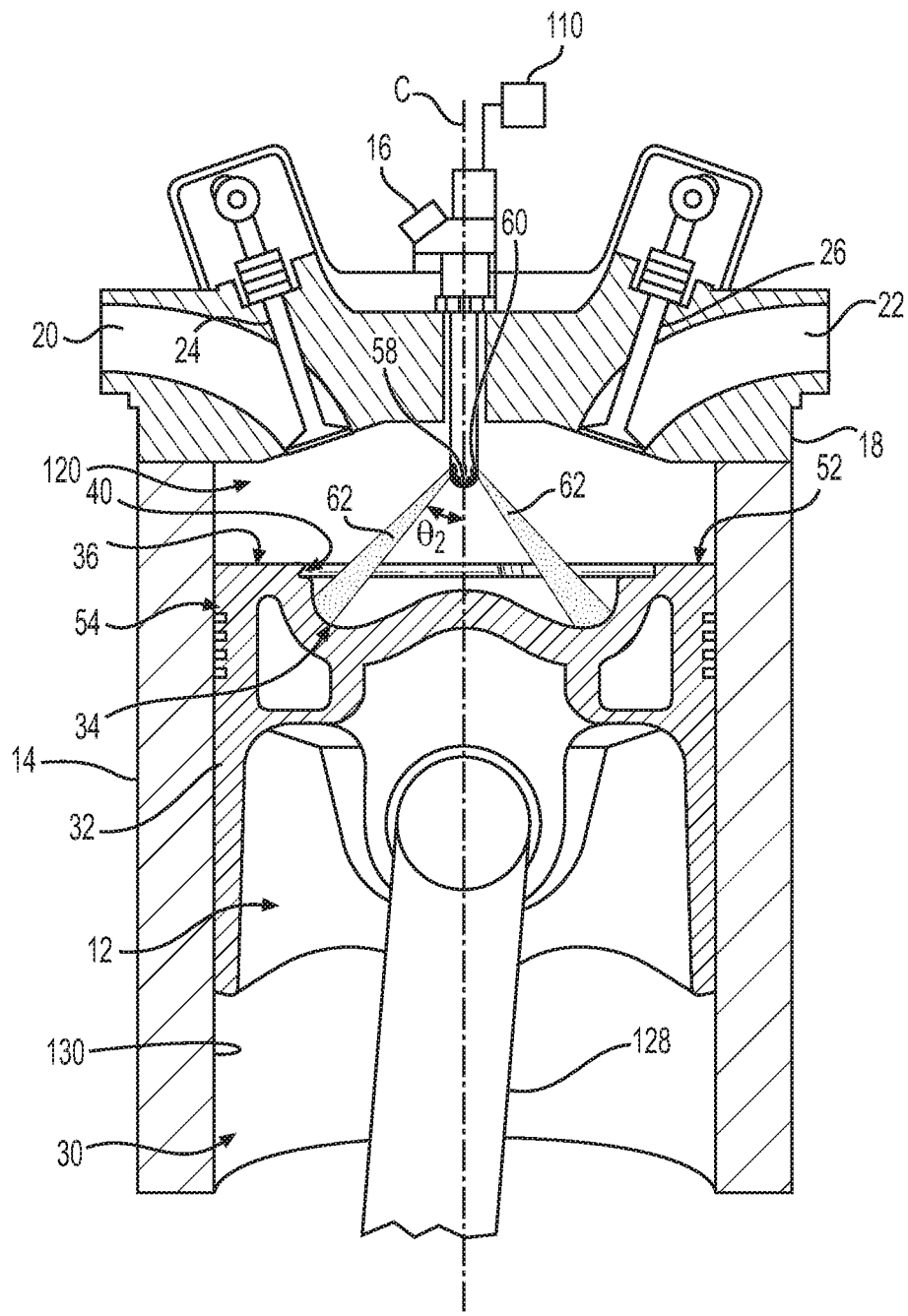
FIG. 4 is a sectional view of the portion of the internal combustion engine in FIG. 1 illustrating a main injection of fuel on a piston bowl.

In step 314, controller 110 may control fuel injector 16 (or another fuel injector) to inject second fuel from second fuel injector orifices 60. In one aspect, this injection may be initiated at approximately 15 degrees or closer to the piston being at top dead center. As shown in FIG. 4, during step 314, a main spray angle $\theta_2$ may be defined by the angle between each main fuel jet 62 and central axis C. In one aspect, main spray angle $\theta_2$ may have a value approximately the same as pilot spray angle $\theta_1$. Thus, main spray angle $\theta_2$ may be within a range of about 60 degrees to about 70 degrees. As piston head 32 may be at a position closer to cylinder head 18 at step 314 as compared to steps 308 and 312, second fuel injector orifices 60 are aimed at piston bowl 34 (see FIG. 4) at positions that are offset from diverters 40 with respect to the circumference of piston head 32. After impinging on portions of piston bowl 34, main fuel jets 62 may be drawn upward, and may interact with recess 38. The interaction of fuel jets 62 and recess 38 may draw fuel jets 62 away from wall 130 of cylinder 14. Also, as second fuel injector orifices 60 can be circumferentially offset from diverters 40, fuel jets 62 may have little, if any, interaction with the diverters 40 even when interacting with recess 38. When step 312 is performed, step 314 represent a second time the second fuel is injected when the piston 12 is between BDC and TDC. Thus, the injection of the second fuel can be initiated at least twice while the piston 12 is between BDC and TDC.

In step 316, the second fuel injected in step 312 (if performed), and in step 314 are autoignited by compression ignition. Thus, in the single-fuel mode (e.g., steps 312, 314, and 316), the piston 12 is completely driven by the second fuel.

Following step 316, the method 300 may return to step 304. Thus, steps 306 through 316 may be performed repeatedly during the operation of internal combustion engine 5 and combustion system 10. Alternatively, step 304 may be performed intermittently, for example after a predetermined number of repetitions of steps 306, 308, and 310 or of steps 312, 314, and 316.

Thus, in method 300, controller 110 may determine when to perform the dual-fuel combustion mode and the single-fuel combustion mode. The single-fuel mode, like the dual-fuel mode, can be performed for a temporary period, or indefinitely. Additionally, as can be seen in FIG. 7, the single-fuel mode and the dual-fuel mode may be performed in any order. In one aspect, the single-fuel mode and the dual-fuel mode may each be performed once or more during a single continuous operation of internal combustion engine 5. However, the performance of the dual-fuel mode and the single-fuel mode in method 300 may be performed in separate operations of an internal combustion engine 5, the engine being stopped and subsequently re-started before switching between single-fuel and dual-fuel modes.

As noted above, the methods and combustion system disclosed herein may facilitate uniformity of the pilot fuel autoignition and provide a more robust ignition source, even when a small number of pilot fuel injection orifices and a relatively low amount of pilot fuel is employed. Thus, a more uniform ignition of the main fuel may be achieved. The occurrence of hot spots may be reduced, which may in turn improve emissions performance. Furthermore, an amount of diesel required to operate the internal combustion engine may be reduced, and gaseous fuel can be employed as the primary fuel, resulting in reduced emissions and/or cost. Additionally, a flexibility in operation of an internal combustion engine may be achieved.

It will be apparent to those skilled in the art that various modifications and variations can be made to the disclosed combustion system without departing from the scope of the disclosure. Other embodiments of the combustion system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. A method of operating a dual-fuel combustion system, comprising:
    reciprocating a piston between a bottom dead center and a top dead center of a cylinder, the piston including a piston bowl, a circumferentially extending recess located radially outside of the piston bowl, and a plurality of diverters in the recess;
    opening an intake valve to introduce a first fuel;
    injecting, by a set of fuel injector orifices substantially aligned with the diverters, a second fuel toward the diverters; and
    autoigniting the second fuel to ignite the first fuel.

2. The method of operating a dual-fuel combustion system according to claim 1, wherein a number of fuel injector orifices in the set of fuel injector orifices is equal to a number of the diverters.

3. The method of operating a dual-fuel combustion system according to claim 1, wherein the first fuel is a gaseous fuel introduced at least partly during an intake stroke as a mixture with air.

4. The method of operating a dual-fuel combustion system according to claim 3, wherein the second fuel is diesel fuel.

5. The method of operating a dual-fuel combustion system according to claim 1, wherein the injecting is initiated at a timing that corresponds to a position of the piston within a range of approximately 60 degrees before the top dead center and 40 degrees before the top dead center.

6. The method of operating a dual-fuel combustion system according to claim 1, further comprising distributing the second fuel circumferentially around the piston bowl by impinging the injected second fuel on the diverters.

7. The method of operating a dual-fuel combustion system according to claim 6, wherein the autoigniting of the second fuel is performed by igniting the circumferentially distributed second fuel prior to ignition of the first fuel.

8. The method of operating a dual-fuel combustion system according to claim 1, wherein the piston is substantially driven by the first fuel.

9. A method of operating a dual-fuel internal combustion engine having a plurality of pistons reciprocating in corresponding piston cylinders and forming a plurality of combustion chambers, comprising:
    in a first dual-fuel combustion mode:
        opening an intake valve to introduce a first fuel; and
        injecting a second fuel into the combustion chamber toward a plurality of diverters in a piston of the combustion chamber, wherein autoignition of the second fuel initiates ignition of the first fuel; and
    in a second single-fuel combustion mode:
        injecting the second fuel into the combustion chamber toward locations circumferentially offset from the diverters, and combusting the second fuel to drive the piston of the combustion chamber.

10. The method of operating a dual-fuel combustion engine according to claim 9, wherein the first fuel is gaseous fuel and the second fuel is diesel fuel.

11. The method of operating a dual-fuel combustion engine according to claim 9, wherein, in the second combustion mode, the injecting of the second fuel is initiated at least twice between the piston being at bottom dead center and top dead center.

12. The method of operating a dual-fuel combustion engine according to claim 9, wherein the second fuel is injected by a first set of fuel injector orifices in the first combustion mode and by a second set of fuel injector orifices in the second combustion mode.

13. The method of operating a dual-fuel combustion engine according to claim 12, wherein an amount of the second fuel injected from the first set of fuel injector orifices is smaller than an amount of the second fuel injected from the second set of fuel injector orifices.

14. The method of operating a dual-fuel combustion engine according to claim 12, wherein a number of fuel injector orifices in the first set is smaller than a number of fuel injector orifices in the second set.

15. The method of operating a dual-fuel combustion engine according to claim 12, wherein a number of fuel injector orifices in the second set is larger than a number of diverters.

16. The method of operating a dual-fuel combustion engine according to claim 12, wherein the fuel injector orifices in the first set and the second set are formed in the same fuel injector.

17. An internal combustion system, comprising:
a piston including:
- a piston bowl;
- a circumferentially extending recess located radially outside of the piston bowl; and
- a plurality of diverters; and a first set of fuel injector orifices generally circumferentially aligned with the plurality of diverters and configured to inject fuel to impinge on the diverters; and a second set of fuel injector orifices generally circumferentially offset from the plurality of diverters.

18. The internal combustion system according to claim 17, wherein the fuel injector orifices in the first set are equally spaced along a circumference of a fuel injector.

19. The internal combustion system according to claim 17, wherein a number of fuel injector orifices in the first set is smaller than a number of fuel injector orifices in the second set.

20. The internal combustion system according to claim 17, further comprising an intake system configured to introduce a mixture of a gaseous fuel and air.

* * * * *